United States Patent
Becker et al.

(10) Patent No.: US 7,735,278 B2
(45) Date of Patent: Jun. 15, 2010

(54) EDGE-ADAPTED DETECTABLE WARNING TILES WITH BOTTOM-SIDE EXTENSIONS

(75) Inventors: Georg R. Becker, Tucson, AZ (US); Jeremiah A. Moore, Tucson, AZ (US)

(73) Assignee: StrongGo LLC, Tucson, AZ (US)

( * ) Notice: Subject to any disclaimer, the term of this patent is extended or adjusted under 35 U.S.C. 154(b) by 0 days.

(21) Appl. No.: 12/235,402

(22) Filed: Sep. 22, 2008

(65) Prior Publication Data

US 2009/0060653 A1   Mar. 5, 2009

Related U.S. Application Data

(63) Continuation-in-part of application No. 11/693,652, filed on Mar. 29, 2007.

(51) Int. Cl.
*E04F 13/08* (2006.01)

(52) U.S. Cl. ............... 52/391; 52/403.1; 52/293.3; 52/126.4; 52/384; 52/386; 52/387; 52/389; 52/136; 52/137; 52/511

(58) Field of Classification Search ........... 52/391, 52/403.1, 293.3, 126, 384, 386, 387, 389, 52/126.6, 509, 136, 137, 235, 511, 513, 125.4, 52/125.5; 404/15
See application file for complete search history.

(56) References Cited

U.S. PATENT DOCUMENTS

| | | | |
|---|---|---|---|
| 979,628 A | 12/1910 | Wright et al. | |
| 1,409,524 A | 3/1922 | Chase | |
| 1,599,745 A | 9/1926 | Cinnamond | |
| 1,652,174 A | 12/1927 | Lampert | |
| 1,696,695 A | 12/1928 | Senesac | |
| 1,699,813 A | 1/1929 | Senesac | |
| 3,087,206 A | 4/1963 | Delf et al. | |
| 5,609,000 A | 3/1997 | Niese | |
| 5,775,835 A | 7/1998 | Szekely | |
| 6,240,697 B1 | 6/2001 | Thompson et al. | |
| RE37,615 E | 4/2002 | Niese | |
| 6,883,287 B2 | 4/2005 | Niese et al. | |
| 6,939,078 B1 | 9/2005 | Anderson et al. | |
| 7,121,052 B2 | 10/2006 | Niese et al. | |
| 7,189,025 B1 | 3/2007 | Greer et al. | |
| 2001/0053310 A1 | 12/2001 | Brown | |
| 2004/0098926 A1 | 5/2004 | Haytayan | |
| 2004/0098927 A1 | 5/2004 | Haytayan | |
| 2005/0193670 A1 | 9/2005 | Niese et al. | |
| 2007/0039269 A1 | 2/2007 | Niese et al. | |

FOREIGN PATENT DOCUMENTS

| | | |
|---|---|---|
| EP | 0529072 | 3/1993 |
| FR | 2553836 | 4/1985 |
| FR | 2597533 | 10/1987 |

*Primary Examiner*—Richard E Chilcot, Jr.
*Assistant Examiner*—Mark R Wendell
(74) *Attorney, Agent, or Firm*—Quarles & Brady LLP; Gavin J. Milczarek-Desai

(57) ABSTRACT

Apparatus and processes that include a detectable warning tile having a top side with a plurality of protuberances forming a pattern or array and a second tile member disposed perpendicular to an edge of the detectable warning tile. The bottom side of both the detectable warning tile and the second tile member have at least one anchoring member embedded within a concavity in the bottom side, making the tile and tile member especially durable on platform edges.

20 Claims, 7 Drawing Sheets

FIG. 5A

PROVIDE A TILE INCLUDING AN EXTENDING MEMBER EMBEDDED WITHIN A CONCAVITIY IN THE BOTTOM SIDE OF THE TILE

SET THE TILE IN A SUBSTRATE SUCH THAT THE SUBSTRATE BONDS TO THE EXTENDING MEMBER

FIG. 5B

PROVIDE A TILE INCLUDING AN ANCHORING MEMBER EMBEDDED WITHIN A CONCAVITIY IN THE BOTTOM SIDE OF THE TILE

COUPLE AN EXTENDING MEMBER TO THE ANCHORING MEMBER

SET THE TILE IN A SUBSTRATE SUCH THAT THE SUBSTRATE HOLDS FAST THE EXTENDING MEMBER

EDGE-ADAPTED DETECTABLE WARNING TILES WITH BOTTOM-SIDE EXTENSIONS

CROSS-REFERENCE TO RELATED APPLICATION

This application is a Continuation-in-Part of application Ser. No. 11/693,652, filed on Mar. 29, 2007.

BACKGROUND OF THE INVENTION

1. Field of the Invention

This invention relates to an apparatus and process for improved detectable warning tiles and installation of tiles in a bonding substrate, such as an adhesive, concrete or asphalt. The invention is especially useful in platform applications, such as those found in light rail platforms.

2. Description of the Related Art

A tile is a manufactured piece of hard-wearing material such as ceramic, cement, stone, metal, plastic, or glass. Flooring tiles in particular are commonly made of ceramic, clay, or stone. Traditionally, floor tiles have typically been set into mortar or "grout," which consists at least of water, sand, and cement (with polymers, color tint, and other additives being common).

More specialized flooring tiles exist in which a protuberance (such as a truncated dome or stud) extends from the top surface of the tile and provides a "detectable warning" of a potentially dangerous situation, such as the end of a curb or the entry to an escalator. In the United States, under the Americans with Disabilities Act (ADA) of 1990, such "detectable warning tiles" are defined as "standardized surface features built in or applied to a walking surface or other elements to warn of hazards on a circulation path."

Essentially two types of methods are used to install detectable warning tiles: setting tiles in freshly poured ("wet") cementitious or asphalt material or attaching warning tiles to the top of a surface with screws or other fasteners and sometimes adhesives.

While attaching warning tiles to a surface generally is faster and less expensive in the short term, it suffers from the inherent problem of leaving a raised surface that may become a tripping hazard. Moreover, warning tiles that are not embedding in concrete or similar material often are less durable, in that cracking, chipping, and detachment of the tile can more readily occur. This increases the time and resources that must be spent to maintain, repair, or replace surface-applied warning tiles.

While typically more costly and time consuming, setting warning tiles in wet concrete, asphalt, or a similar substrate and then allowing the substrate to harden or cure provides a level finished-surface and a tile that is strongly bonded to its substrate material. Thus, this method is often the method of choice in new construction and some retrofitting applications. However, setting a warning tile in concrete does not always guarantee improved durability. Indeed, if the installation is made improperly, the tile may crack or become loose. This is especially the case in today's market in which light rail and other platforms requiring detectable warning tiles are being build in increasing numbers.

Such platforms have exposed edges. Since detectable warning tiles must be installed at the platform edge, it often is the case that the tiles are damaged from impacts and other wear occurring at the edge. Thus, there continues to be a need for improved detectable warning tiles and methods for installing tiles that are offer improved durability and that are especially well suited platform-edge applications.

SUMMARY OF INVENTION

The invention relates to a tile, and especially detectable warning tiles, having an extending member embedded within a concavity in the bottom side of the tile. More particularly, the tile may include an anchoring member and an extending member that bonds with a substrate, such as a cementitious material. Thus, when the substrate hardens or cures around the extending member, an improved bond between the tile and substrate is made.

In one embodiment, the concavity in which the extending member and/or anchoring member is embedded does not perforate the top side of the tile. Indeed, the concavity extends no more than about three quarters of the thickness of the tile in order to avoid cracking and other problems that may occur with a void that runs all the way, or substantially all the way, through a tile.

In another embodiment, the tile further includes a plurality of protuberances on the top side, thereby providing a detectable warning tile. The plurality of protuberances preferably form a regularly arranged pattern or array, which, in one embodiment, includes one or more structures selected from the group consisting of studs, domes, and truncated domes.

Another embodiment that is of particular use for platform edge applications features a dual-component detectable warning tile system. The system including (1) a detectable warning tile having a top side with a plurality of protuberances forming a pattern or array thereon, a bottom side, and an anchoring member embedded within a concavity in the bottom side of the tile and (2) a second tile member disposed perpendicular to an edge of the detectable warning tile and having a bottom side including a second anchoring member embedded within a concavity (such that the second anchoring member faces the anchoring member of the detectable warning tile).

The invention also relates to methods for installing a tile that, in one embodiment, includes the steps of providing a tile that includes at least one extending member embedded within a concavity in the bottom side of the tile and setting the tile in a substrate such that the substrate holds fast the extending member.

In another embodiment, the method for installing a tile includes the steps of: (a) providing a tile including an anchoring member embedded within a concavity in the bottom side of the tile; (b) coupling an extending member to the anchoring member; and (c) setting the tile in a substrate such that the substrate holds fast the extending member. In some applications, the method preferably further includes the step of applying an adhesive substrate on the bottom side of the tile prior to the setting step. Installation methods for a dual component tile system also are described.

Thus, it will be appreciated that the apparatus and methods of the invention provide new and improved tiles and installation processes that may be used in a variety of applications including along platform edges.

BRIEF DESCRIPTION OF THE DRAWINGS

FIGS. 5A and 5B illustrate in flow diagram the basic steps involved in installation methods of the invention.

DETAILED DESCRIPTION OF THE PREFERRED EMBODIMENTS

Figure 1:
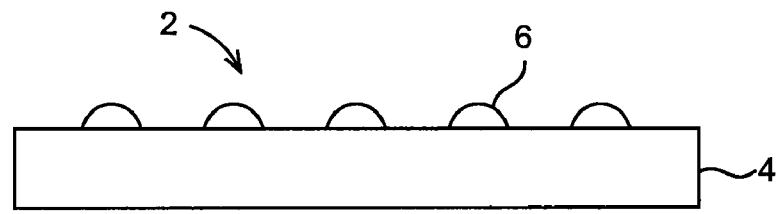
FIG. 1 schematically illustrates in side elevational view a prior tile design.

Turning to FIG. 1, a simplified and schematic drawing of a prior-art tile design is shown. While, of course, many other prior tile designs are known, this particular tile 2 includes a planar structure 4 upon which domes 6 are disposed. Thus, the tile 2 may function as a detectable warning tile. Such tiles typically are installed either by drilling holes through the tile and then fastening it to a surface or by setting the tile in wet cement or asphalt and allowing it to bond thereto. The apparatus and methods disclosed herein improve upon these prior tile designs and processes.

Figure 2A:
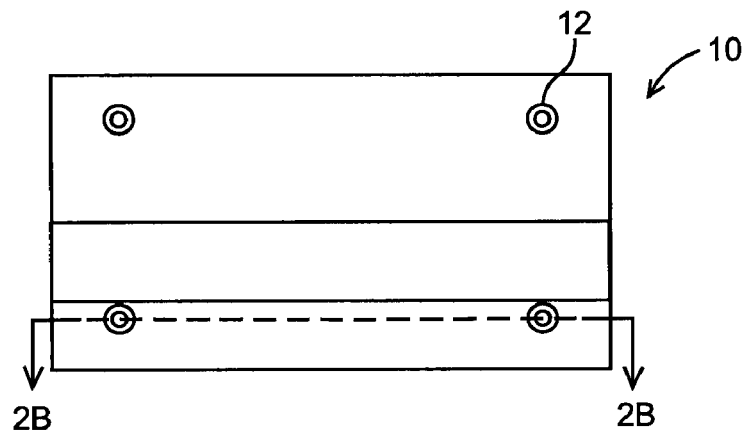
FIG. 2A schematically illustrates in bottom elevational view a first embodiment of the invention.

FIG. 2A schematically illustrates a first embodiment of the invention. As seen from the bottom side, tile 10 includes an anchoring member 12 embedded within a concavity in the tile. While at least four anchor members 12 disposed in the region of each tile corner is preferred, more or fewer may be disposed upon tile 10.

Figure 2B:
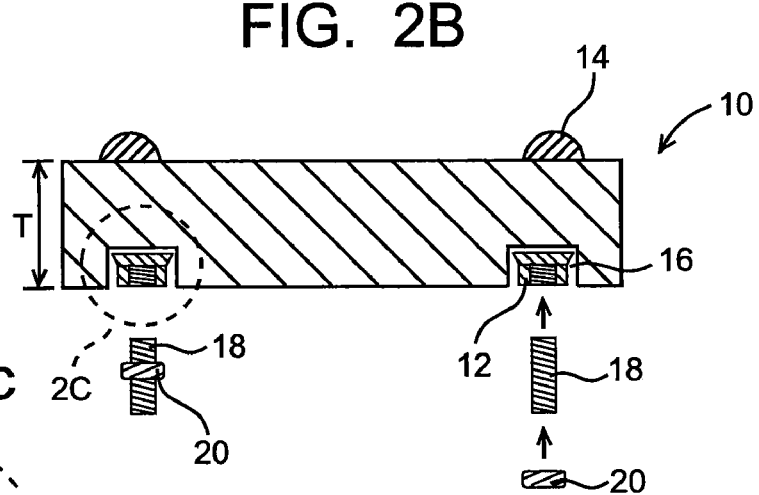
FIG. 2B is a magnified cross-sectional view of the embodiment of FIG. 2A taken along line 2B-2B and viewed in the direction indicated by the line arrows.

As seen in the magnified cross-sectional view of FIG. 2B, the embodiment shown in FIG. 2A further includes domes 14 disposed upon the top side of tile 10. On the bottom side of tile 10, anchoring members 12 are better seen to be embedded in a respective concavity 16. Preferably, concavity 16 does not perforate the top side of the tile 10 in order to avoid weakening the structural integrity of the tile. In this embodiment, the anchoring members 12 are embedded to about one-fourth of the thickness (T) of tile 10. In other embodiments (not shown), the concavity may extend up to about three quarters of the thickness of a tile.

As shown on the right side of FIG. 2B, the anchoring member 12 may be a grasping member that is adapted to be coupled with an extending member 18. In this embodiment, the extending member 18 is a threaded rod. Thus, extending member 18 is coupled to the anchoring member 12 through rotating the extending member into the anchoring member. Moreover, the threaded rod may further include a nut 20 attached to the rod. The nut 20 can be moved into a position that is flush with the anchoring member 12, thereby preventing the extending member 18 from coming loose once it is coupled to the anchoring member.

Figure 2C:
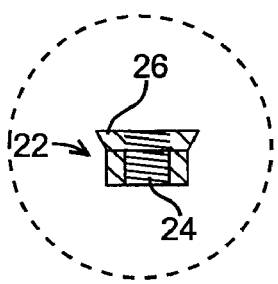
FIG. 2C is a slightly magnified detail of a preferred anchor member from the embodiment depicted in FIG. 2B.

FIG. 2C is a slightly magnified detail of the preferred anchoring member from the embodiment depicted in FIG. 2B. As mentioned above, the anchoring member 12 can be a grasping member, such as a nut 22 having threads 24 that are adapted for coupling with an extending member (e.g., a threaded rod). Preferably, nut 22 includes a flanged portion 26 disposed thereon. The flanged portion 26 makes nut 22 highly resistant to loosening or being removed from tile 10, in that the embedded flange is more securely supported by the surrounding tile structure.

While the anchoring member 12 may be either somewhat inset (recessed) into tile 10 or extending from tile 10, in many applications the anchoring member is flush or slightly recessed relative to the bottom side of the tile as shown. Of course, the anchoring member 12 is not required to be threaded, and an extending member may be coupled to the anchoring member in a number of ways, such as through frictional engagement or with an adhesive.

Figure 3:
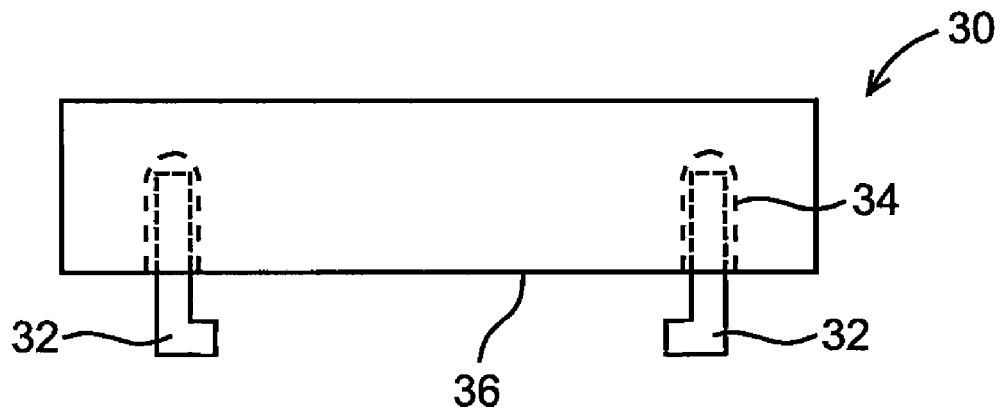
FIG. 3 is a schematic, elevational side view illustrating a second embodiment of the invention.

Turning to FIG. 3, a second embodiment of the invention is illustrated. In this embodiment, the tile 30 includes extending members 32 disposed within concavities 34 (symbolized by the outer phantom line) on the bottom side 36 of the tile. The extending members 32 are shown to be L-screws. However, any number of structures made of various strong materials may be embedded into tile 30 so long as they extend from the bottom surface 36 and can be bonded by a substrate such the tile is securely installed.

The anchoring members or extending members of the invention may be fabricated in the tiles as they are produced or may be added afterwards. For example, as a cement tile is manufactured, a nut may be positioned in the wet cement at desired locations on the bottom side of the tile. Any cement that blebs within the center of the nut may be evacuated prior to hardening. Alternatively, a finished tile may be drilled such that a nut or extending member may be installed in a concavity on the tile's bottom side. Thus, for example, a plastic tile may have holes formed in the tile bottom into which screws are embedded.

Figure 4:
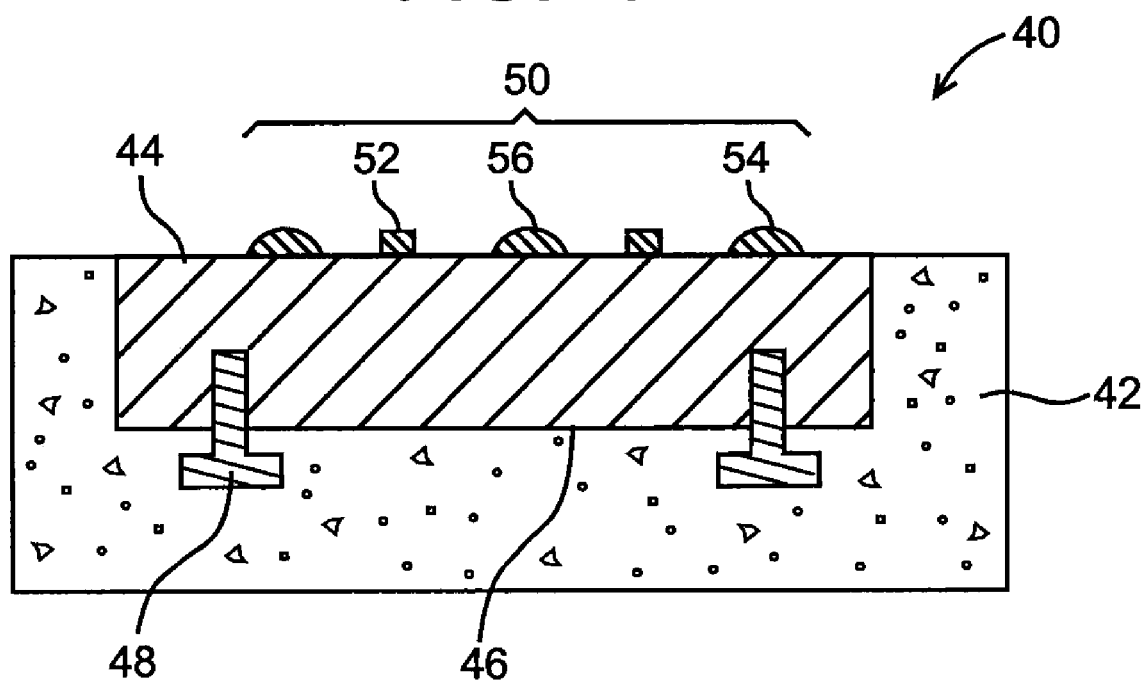
FIG. 4 is cross-sectional view of a tile arrangement embodiment of the invention.
Figure 6:
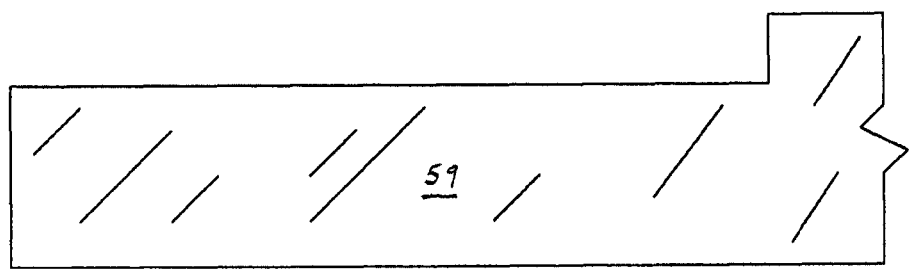
FIG. 6 illustrates a light rail platform after preparation for installation of one or more detectable warning tiles.
Figure 7:
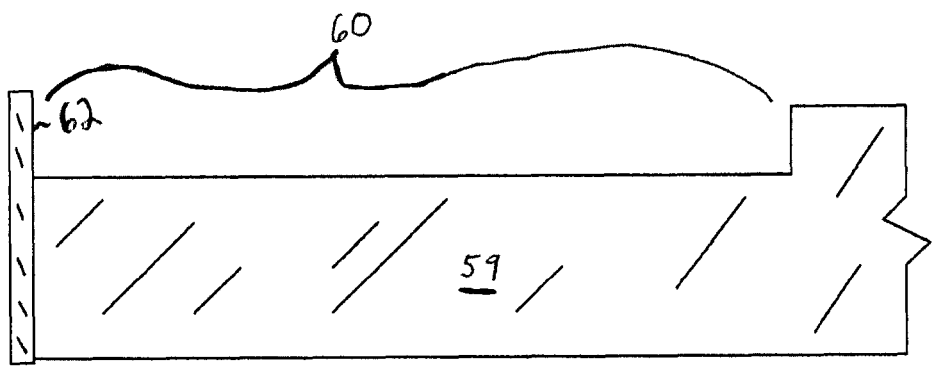
FIG. 7 illustrates the light rail platform of FIG. 6 after a mold area has been created.
Figure 8:
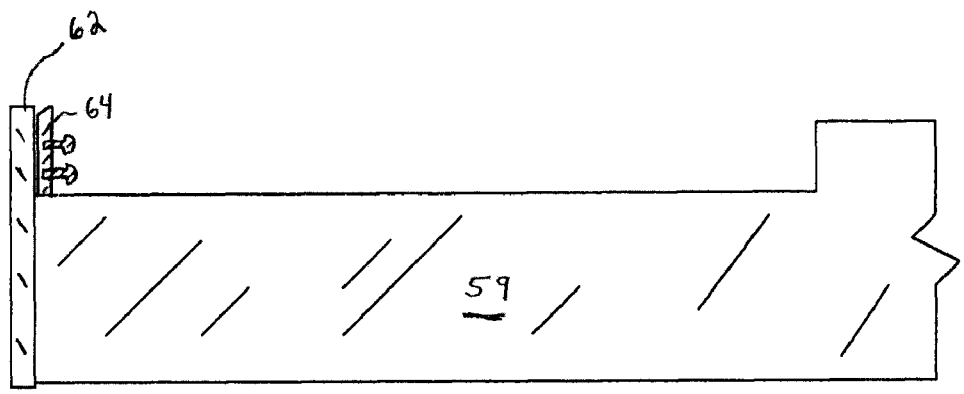
FIG. 8 illustrates the setting of a tile member of the invention into the mold area of FIG. 7.
Figure 9:
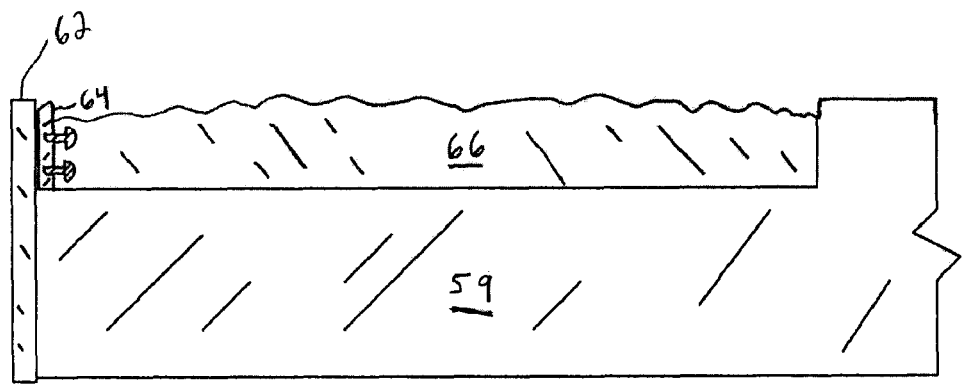
FIG. 9 illustrates the application of a wet substrate to the mold area of FIG. 8.
Figure 10:
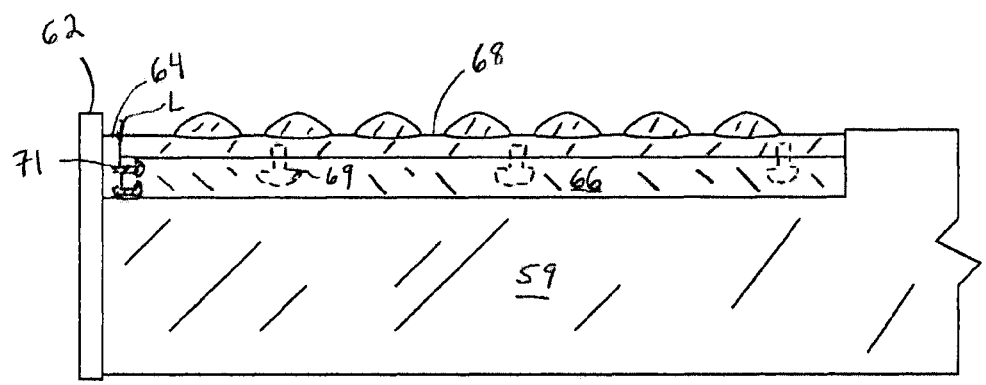
FIG. 10 illustrates the setting of a detectable warning tile of the invention into the mold area of FIG. 9.
Figure 11:
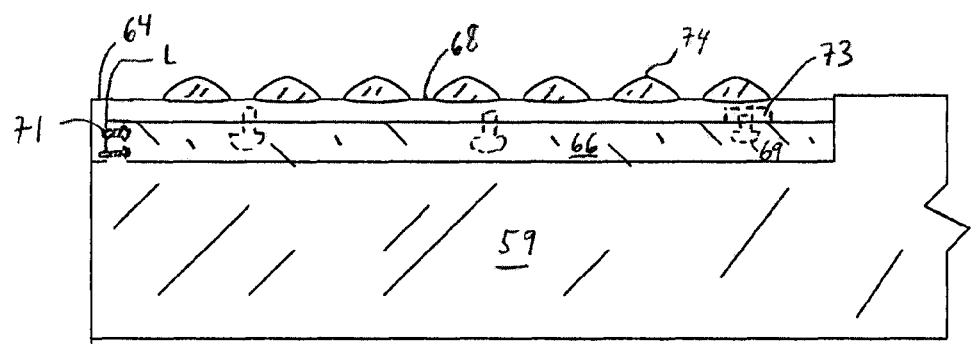
FIG. 11 illustrates the tile member and detectable warning tile of the invention on the platform edge after curing or hardening of the substrate.

As illustrated in cross-sectional view in FIG. 4, a tile arrangement embodiment of the invention includes tile 40 that has been set in an asphalt or in a cementitious material substrate, such as concrete 42. The tile 40 has a top side 44 and a bottom side 46, with extending members (bolts 48) embedded within concavities in the bottom side 46 of the tile. In this embodiment, the concrete contacts the bottom and sides of the tile and holds fast the bolts 48.

The tile 40 further includes a plurality of protuberances 50 on top side 44. The plurality of protuberances 50 may form an array of one or more structures selected from the group consisting of studs 52, domes 54, and truncated domes 56.

FIGS. 5A and 5B illustrate in flow diagram the basic steps involved in installation methods of the invention. In a basic embodiment, the method for installing a tile includes the steps of providing a tile including an extending member embedded within a concavity in the bottom side of the tile and setting the tile in a substrate such that said substrate holds fast the extending member.

Preferably, the basic method above further includes the step of applying an adhesive substrate on the bottom side prior to setting the tile. The adhesive substrate may be the same as or different from the substrate that the tile is being set into.

In another embodiment, the method for installing a tile includes the steps of: (a) providing a tile including an anchoring member embedded within a concavity in the bottom side of the tile; (b) coupling an extending member to the anchoring member; and (c) setting the tile in a substrate such that the substrate holds fast the extending member. As above, this embodiment may further include the step of applying an adhesive substrate on the bottom side of the tile prior to the setting step.

Thus, for example, a detectable warning tile having four pre-installed grasping members in the bottom of the tile is provided to a work site. The user then couples a threaded rod to each grasping member. After coupling each threaded rod, the tile is flipped over and set into wet concrete. Preferably, the center and all four corners of the tile are pressed down evenly to allow the smooth penetration of the threaded rods into the concrete.

While the invention is contemplated for use primarily for applications in which a tile is set in fresh cementitious or asphalt material, alternatively, a tile of the invention may be installed on a surface by filling holes in the surface with an adhesive material and then setting the tile such that the extensions are held fast by the adhesive. Preferably, the bottom side of the tile also would be "buttered" by the adhesive so that a stronger and more uniform bond with the surface may be achieved.

Turning to FIGS. 6-11, a method for installing a detectable warning tile at a platform 59 edge is illustrated. In overview of this embodiment, the method includes the steps of: (a) providing a detectable warning tile having a top side and an anchoring member embedded within a concavity in the bottom side; (b) providing a second tile member including a second anchoring member embedded within a concavity; and (c) setting the detectable warning tile and said second tile member in a wet substrate such that the detectable warning tile and second tile member form a substantially L-shaped corner at the platform edge and the wet substrate hardens around and holds fast each anchoring member.

As seen in FIGS. 7-11, a form or mold area 60 is created by placing a support 62 at a platform 59 edge that has been prepared for detectable warning tile installation. Preferably, the tile member 64 is then set in the mold area 60 prior to a wet substrate being poured. After the wet substrate (such as cement 66) is poured, the detectable warning tile 68 is set such that an "L-shaped corner" L is formed through the detectable warning tile 68 being placed substantially perpendicular to the tile member 64, and the cement is allow to harden/cure around each anchoring member 69 of the detectable warning tile and 71 second tile member. The anchoring member of either the warning tile or second tile member may be held in place through a grasping member 73, such at that illustrated in FIG. 11.

Figure 12:
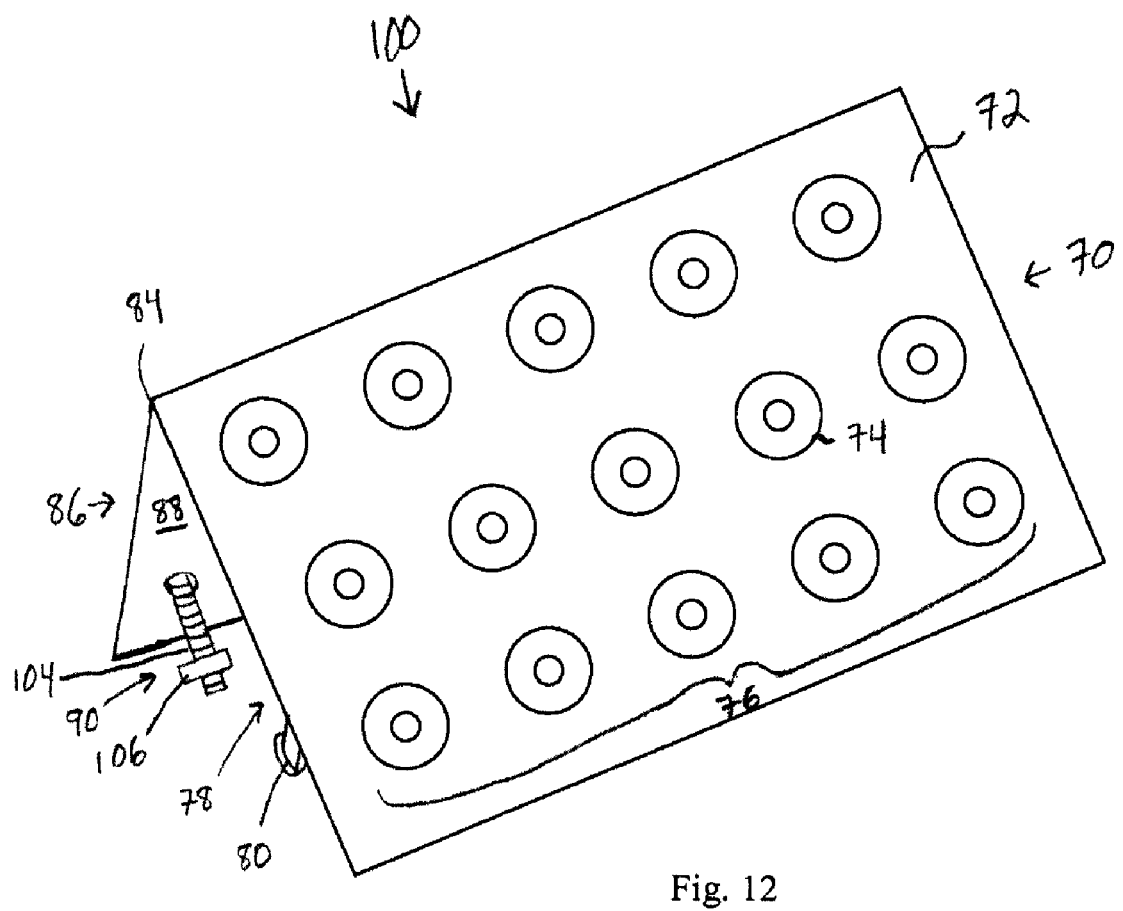
FIG. 12 illustrates an alternative embodiment of the invention.

As shown in FIG. 12, the two components of the invention may comprise a single piece. However, coupling two independent components as described and illustrated above is believed to provide better resistance to cracking and other damage caused by impacts typically experienced along a platform edge. A detectable warning tile 70 includes a top side 72 with a plurality of protuberances 74 forming a pattern or array 76 thereon, a bottom side 78, and at least one anchoring member 80 embedded in the bottom side of the tile 70. Disposed perpendicular to an edge 84 of the detectable warning tile 70 is a tile member 86 having a bottom side 88 including a second anchoring member 90 embedded on bottom side 88. The second anchoring member 90 faces the anchoring member 80 of the detectable warning tile 70 such that both anchoring members are secured in place by the hardening of a wet substrate (as in FIGS. 10-11). Thus, an L-shaped corner 100 is formed.

As is further illustrated, either or both anchoring members 80 and 90 may include an extending member (such as threaded rod 104). The extending member may include a nut 106 disposed thereon.

Thus, a tile arrangement is formed that includes a detectable warning tile having a top side with a plurality of protuberances forming a pattern or array thereon, a bottom side, and an anchoring member embedded within a concavity in the bottom side of the tile, a second tile member disposed perpendicular to an edge of the detectable warning tile and having a bottom side including a second anchoring member embedded within a concavity, and a substrate that contacts and has bonded to the bottom side of both the detectable warning tile and second tile member and that has hardened around each anchoring member so as to hold fast.

Various changes in the details that have been described may be made by those skilled in the art within the principles and scope of the invention herein described in the specification and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

What is claimed is:

1. A detectable warning tile having a top side with a plurality of protuberances forming a pattern or array thereon, a bottom side, and an anchoring member attached within a concavity in the bottom side of the tile;
   a second tile member disposed perpendicular to an edge of said detectable warning tile and having a bottom side including a second anchoring member attached within a concavity, said second anchoring member facing the anchoring member of the detectable warning tile; and
   a hardening substrate or cementitious material, wherein said anchoring members of both the detectable warning tile and the second tile member are embedded in said hardening substrate or cementitious material such that the material bonds with the bottom of the detectable warning tile and second tile member and holds fast each anchoring member and tile in permanent arrangement therewith.

2. The apparatus of claim 1, wherein said concavity does not perforate said top side of the detectable warning tile.

3. The apparatus of claim 1, wherein said detectable warning tile and said second tile member are two independent components.

4. The apparatus of claim 3, wherein said components are coupled such that an L-shaped corner is formed.

5. The apparatus of claim 1, wherein said detectable warning tile and said second tile member are of unitary construction.

6. The apparatus of claim 1, wherein said plurality of protuberances comprise an array of one or more structures selected from the group consisting of studs, domes, and truncated domes.

7. The apparatus of claim 1, wherein either or both anchoring members comprise a grasping member embedded within said concavity, said grasping member being adapted to couple with an extending member.

8. The apparatus of claim 7, wherein said gasping member comprises a nut.

9. The apparatus of claim 8, wherein said nut includes a flanged portion disposed thereon.

10. The apparatus of claim 7, wherein said extending member comprises a threaded rod.

11. The apparatus of claim 10, wherein said threaded rod further includes a nut attached thereon.

12. A tile arrangement, comprising:
- a detectable warning tile having a top side with a plurality of protuberances forming a pattern or array thereon, a bottom side, and an anchoring member attached within a concavity in the bottom side of the tile;
- a second tile member disposed perpendicular to an edge of said detectable warning tile and having a bottom side including a second anchoring member attached within a concavity; and
- a substrate, wherein each of said anchoring members of both the detectable warning tile and the second tile member are embedded in said substrate such that the substrate bonds with the bottom of the detectable warning tile and second tile member and holds fast each anchoring member and each tile in permanent arrangement therewith.

13. The tile arrangement of claim 12, wherein said substrate comprises a cementitious or asphalt material.

14. The tile arrangement of claim 12, wherein said substrate comprises an adhesive material.

15. The tile arrangement of claim 12, wherein said detectable warning tile and said second tile member are two independent components.

16. The tile arrangement of claim 15, wherein said components are coupled such that an L-shaped corner is formed.

17. The tile arrangement of claim 12, wherein said plurality of protuberances comprise an array of one or more structures selected from the group consisting of studs, domes, and truncated domes.

18. A method for installing a detectable warning tile at a platform edge, comprising the steps of:
- (a) providing a detectable warning tile having a top side and a bottom side, said tile including an anchoring member attached within a concavity in the bottom side of the tile;
- (b) providing a second tile member having a bottom side including a second anchoring member attached within a concavity; and
- (c) setting said detectable warning tile and said second tile member in a wet substrate such that the detectable warning tile and second tile member form a substantially L-shaped corner at said platform edge and said wet substrate hardens around and holds fast each anchoring member and bonds with substantially all of the bottom side of both the detectable warning tile and the second tile member.

19. The method of claim 18, wherein said tile member is set in a mold area prior to said wet substrate being poured.

20. The method of claim 19, wherein said detectable warning tile is set after said wet substrate is poured.

* * * * *

UNITED STATES PATENT AND TRADEMARK OFFICE
CERTIFICATE OF CORRECTION

| | | |
|---|---|---|
| PATENT NO. | : 7,735,278 B2 | Page 1 of 1 |
| APPLICATION NO. | : 12/235402 | |
| DATED | : June 15, 2010 | |
| INVENTOR(S) | : Geog R. Becker and Jeremiah A. Moore | |

It is certified that error appears in the above-identified patent and that said Letters Patent is hereby corrected as shown below:

Column 6, line 64, Claim 8, "gasping" should be -- grasping --

Signed and Sealed this

Third Day of August, 2010

David J. Kappos
*Director of the United States Patent and Trademark Office*